(12) United States Patent
Kim et al.

(10) Patent No.: US 9,955,080 B2
(45) Date of Patent: Apr. 24, 2018

(54) IMAGE ANNOTATION

(71) Applicant: LG Electronics Inc., Seoul (KR)

(72) Inventors: Sujin Kim, Seoul (KR); Sunghye Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 57 days.

(21) Appl. No.: 15/099,852

(22) Filed: Apr. 15, 2016

(65) Prior Publication Data

US 2017/0064207 A1 Mar. 2, 2017

(51) Int. Cl.
| | |
|---|---|
| *H04N 5/225* | (2006.01) |
| *H04N 5/232* | (2006.01) |
| *G06F 17/30* | (2006.01) |
| *G06K 9/00* | (2006.01) |
| *H04M 1/725* | (2006.01) |

(52) U.S. Cl.
CPC ... *H04N 5/23293* (2013.01); *G06F 17/30047* (2013.01); *G06K 9/00671* (2013.01); *H04M 1/72522* (2013.01); *H04N 5/23216* (2013.01); *H04N 5/23229* (2013.01); *H04M 1/72555* (2013.01); *H04M 2250/22* (2013.01); *H04M 2250/52* (2013.01)

(58) Field of Classification Search
USPC .................................................. 348/333.02
See application file for complete search history.

(56) References Cited

U.S. PATENT DOCUMENTS

| | | | |
|---|---|---|---|
| 8,810,599 B1* | 8/2014 | Tseng | G06T 7/0018 340/435 |
| 2011/0043642 A1* | 2/2011 | Yu | G06F 17/30247 348/207.1 |
| 2011/0213664 A1* | 9/2011 | Osterhout | G02B 27/017 705/14.58 |
| 2011/0273575 A1* | 11/2011 | Lee | G01C 21/20 348/222.1 |
| 2012/0075345 A1* | 3/2012 | Lee | G06F 17/30247 345/633 |
| 2012/0162481 A1 | 6/2012 | Kim et al. | |

(Continued)

FOREIGN PATENT DOCUMENTS

EP 2985687 2/2016

OTHER PUBLICATIONS

European Search Report in European Application No. 16157265.6-1903, dated Jan. 23, 2017, 7 pages (with English translation).

*Primary Examiner* — Twyler L Haskins
*Assistant Examiner* — Dwight Alex C Tejano
(74) *Attorney, Agent, or Firm* — Fish & Richardson P.C.

(57) ABSTRACT

A mobile terminal includes a display unit, a camera that is configured to capture images, and a controller. The controller is configured to access a preview image that is captured by the camera and that includes an object. The controller is further configured to determine, based on the preview image, whether the camera is focused on the object and a prescribed condition of the object is satisfied. The controller is further configured to output, based on a determination that the camera is focused on the object and the prescribed condition of the object is satisfied, information associated with the object by overlaying the information associated with the object on the preview image.

18 Claims, 12 Drawing Sheets

(56) References Cited

U.S. PATENT DOCUMENTS

| | | | |
|---|---|---|---|
| 2013/0188886 A1* | 7/2013 | Petrou | G06F 3/048 382/305 |
| 2014/0036129 A1* | 2/2014 | Nonaka | H04N 1/00244 348/333.02 |
| 2014/0063317 A1* | 3/2014 | Jung | G06F 17/30743 348/333.02 |
| 2014/0092292 A1* | 4/2014 | Kuznetsov | H04N 5/23293 348/333.02 |
| 2014/0285686 A1 | 9/2014 | Cho et al. | |
| 2014/0320722 A1* | 10/2014 | Cho | H04N 5/232 348/333.02 |
| 2015/0012426 A1* | 1/2015 | Purves | G06Q 30/0623 705/41 |
| 2015/0181126 A1* | 6/2015 | Harada | G06F 17/3082 348/333.02 |
| 2015/0193104 A1* | 7/2015 | Cho | G06F 3/0484 715/760 |

* cited by examiner

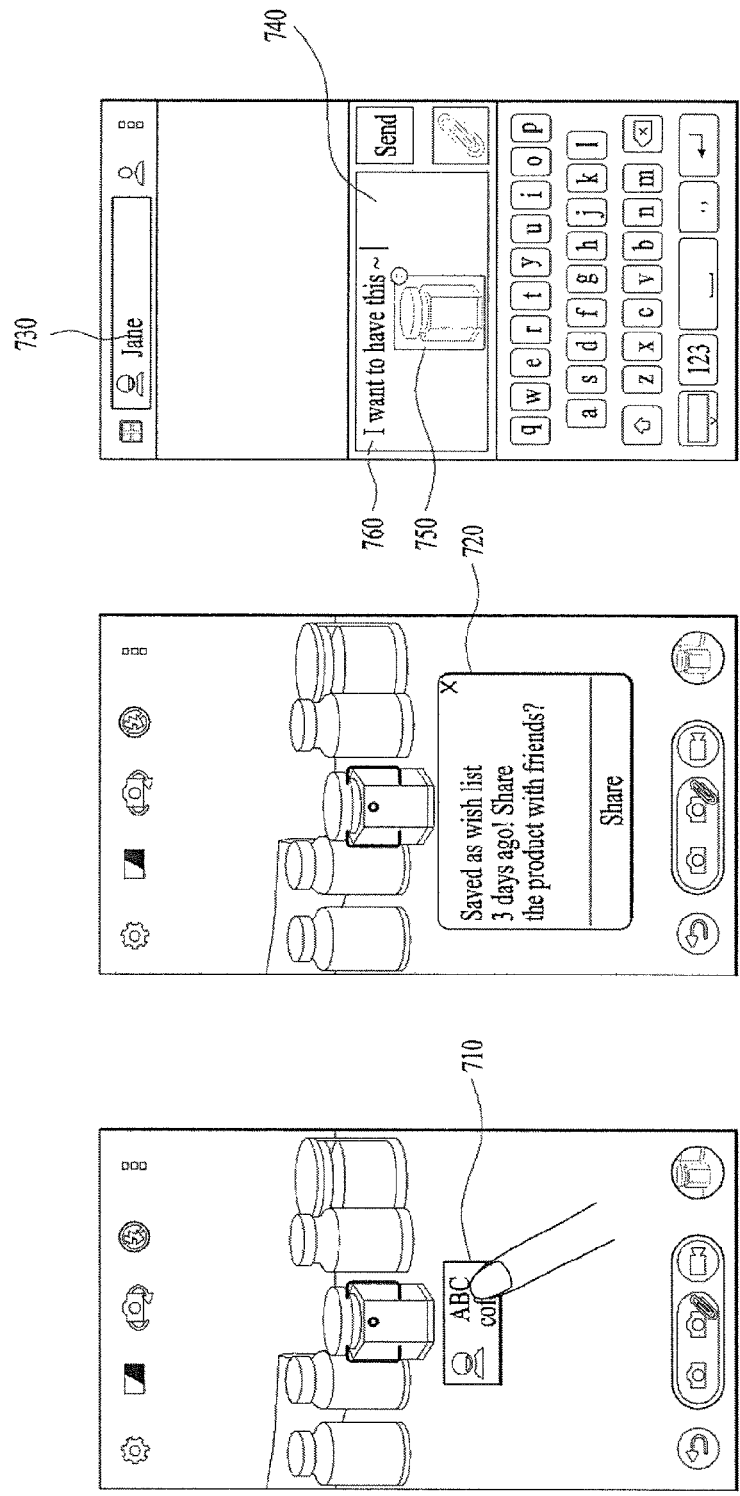

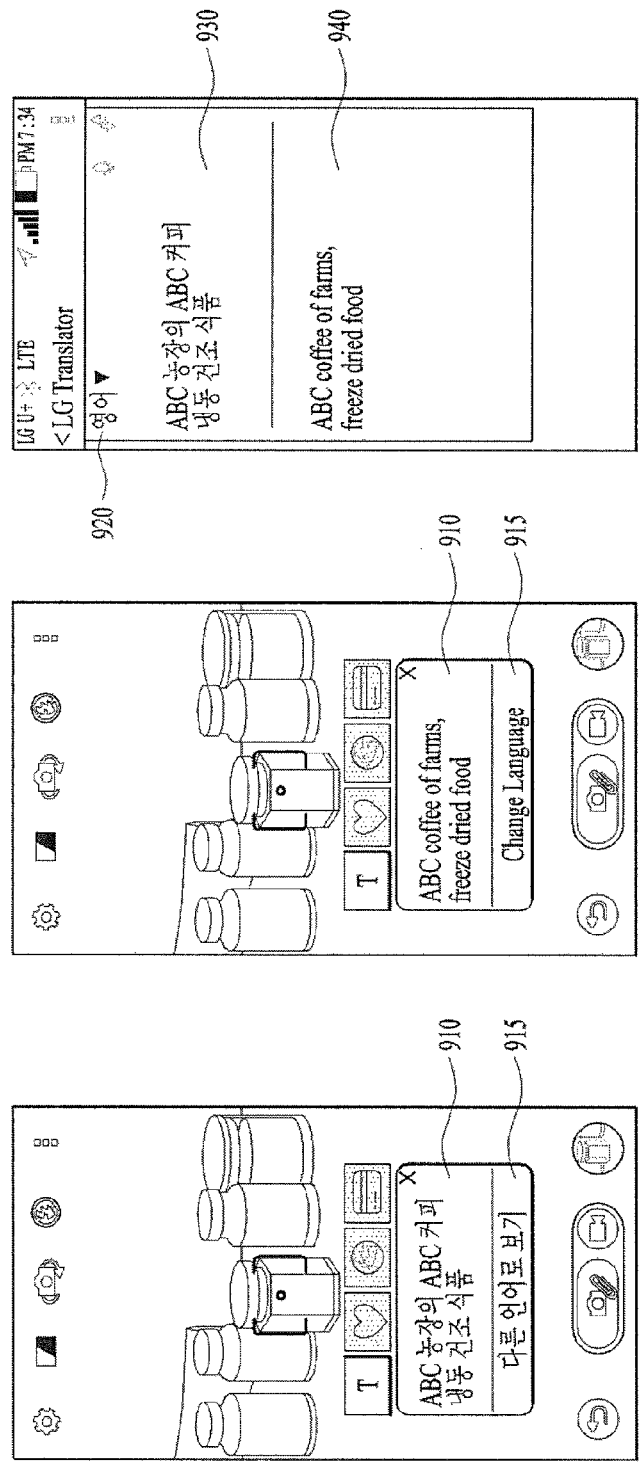

IMAGE ANNOTATION

CROSS REFERENCE TO RELATED APPLICATION

Pursuant to 35 U.S.C. § 119(a), this application claims the benefit of earlier filing date and right of priority to Korean Application No. 10-2015-0121824, filed on Aug. 28, 2015, the contents of which are hereby incorporated by reference herein in its entirety.

FIELD

The present disclosure relates to a mobile terminal.

BACKGROUND

Terminals may be generally classified as mobile/portable terminals or stationary terminals according to their mobility. Mobile terminals may also be classified as handheld terminals or vehicle mounted terminals according to whether or not a user can directly carry the terminal.

A function of a mobile terminal is diversifying. For instance, the function of the mobile terminal may include data and audio communication, picture and video capturing via a camera, voice recording, playing a music file via a speaker system and outputting an image or a video on a display unit. Some terminals perform a function of an electronic game or a function of a multimedia player. In particular, a latest mobile terminal can receive a multicast signal providing visual contents such as a broadcast, a video and a television program.

As a function of a terminal is diversified, the terminal is implemented in a multimedia player form equipped with complex functions including capturing a picture or a video, playing music or a video file, gaming, receiving a broadcast and the like for example.

SUMMARY

According to an innovative aspect of the subject matter described in this application, a mobile terminal includes: a display unit; a camera that is configured to capture images; and a controller that is configured to: access a preview image that is captured by the camera and that includes an object; determine, based on the preview image, whether the camera is focused on the object and a prescribed condition of the object is satisfied; and output, based on a determination that the camera is focused on the object and the prescribed condition of the object is satisfied, information associated with the object by overlaying the information associated with the object on the preview image.

The mobile terminal may include one or more of the following optional features. The preview image includes a first shot button that is configured to trigger taking an image with the camera. The controller is configured to output a second shot button to the preview image. The controller is configured to take an image through the camera and save the taken image in association with the information based on receiving a touch input of the second shot button. The controller is configured to display the image and overlay the information on the taken image based on receiving a user input for inquiring about the image taken through the second shot button. The controller is configured to take an image through the camera and prevent saving of the information in association with the taken image based on receiving a touch input of the first shot button. The controller is configured to output an image list and display, in the image list and in a distinguishable manner, a first image taken through the first shot button and a second image taken through the second shot button. The controller is configured to indicate that the information will be outputted by outputting feedback based on the prescribed condition expiring while focusing on the object. The feedback includes at least one of sound, vibration, or light.

The prescribed condition includes at least one of a prescribed time expiring while focusing on the object or receiving a user input of touching the focused object. The controller is configured to reset a timing of the prescribed time based on detecting that the mobile terminal has moved a prescribed distance and based on the prescribed time having not expired since the camera focused on the object. The controller is configured to stop outputting the information based on the camera no longer being focused on the object. The information includes at least one of a name of the object, a description of the object, an address to access a website related to the object, purchasing information for the object, a wish list of a user, or purchasing information for a product associated with the object. The controller is configured to output first subordinate information in the information based on a date associated with the information not being within a prescribed period. The controller is configured to output second subordinate information in the information based on a date associated with the information being within the prescribed period. The controller is configured to output, after expiration of a prescribed period, a message composition screen that is configured to share the object with another terminal based on a date associated with the information being within the prescribed period. The controller is configured to add a taken image of the object to a text body in the message composition screen.

According to another innovative aspect of the subject matter described in this application, a method of controlling a mobile terminal includes the actions of outputting a preview image that is captured through a camera; focusing on an object that is included in the preview image; determining that a prescribed condition of the object is satisfied; and based on the camera being focused on the object and the prescribed condition being satisfied, displaying information associated with the object by overlaying the information associated with the object on the preview image.

The method may include one or more of the following optional features. The actions include displaying, in the preview image, a first shot button that is configured to trigger taking an image with the camera; and displaying, in the preview image, a second shot button. The actions include indicating that the information will be outputted by outputting feedback based on the prescribed condition expiring while focusing on the object. The prescribed condition includes at least one of a prescribed time expiring while focusing on the object or receiving a user input of touching the focused object. The actions include stopping to output the information based on the camera no longer being focused on the object.

An object of the subject matter described in this application is to provide a mobile terminal and controlling method thereof, by which user's convenience can be enhanced.

In particular, another object of the subject matter described in this application is to provide a mobile terminal and controlling method thereof, by which information on an object included in a preview image of a camera can be outputted.

Another object of the subject matter described in this application is to provide a mobile terminal and controlling method thereof, by which a taken photo and an information on an object can be saved in a manner of being linked to each other.

BRIEF DESCRIPTION OF THE DRAWINGS

FIGS. 7A-7C are diagrams of example mobile terminals outputting a message window for querying whether to share a product.

FIGS. 9A-9C are diagrams of example mobile terminals outputting a translated product description.

DETAILED DESCRIPTION

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
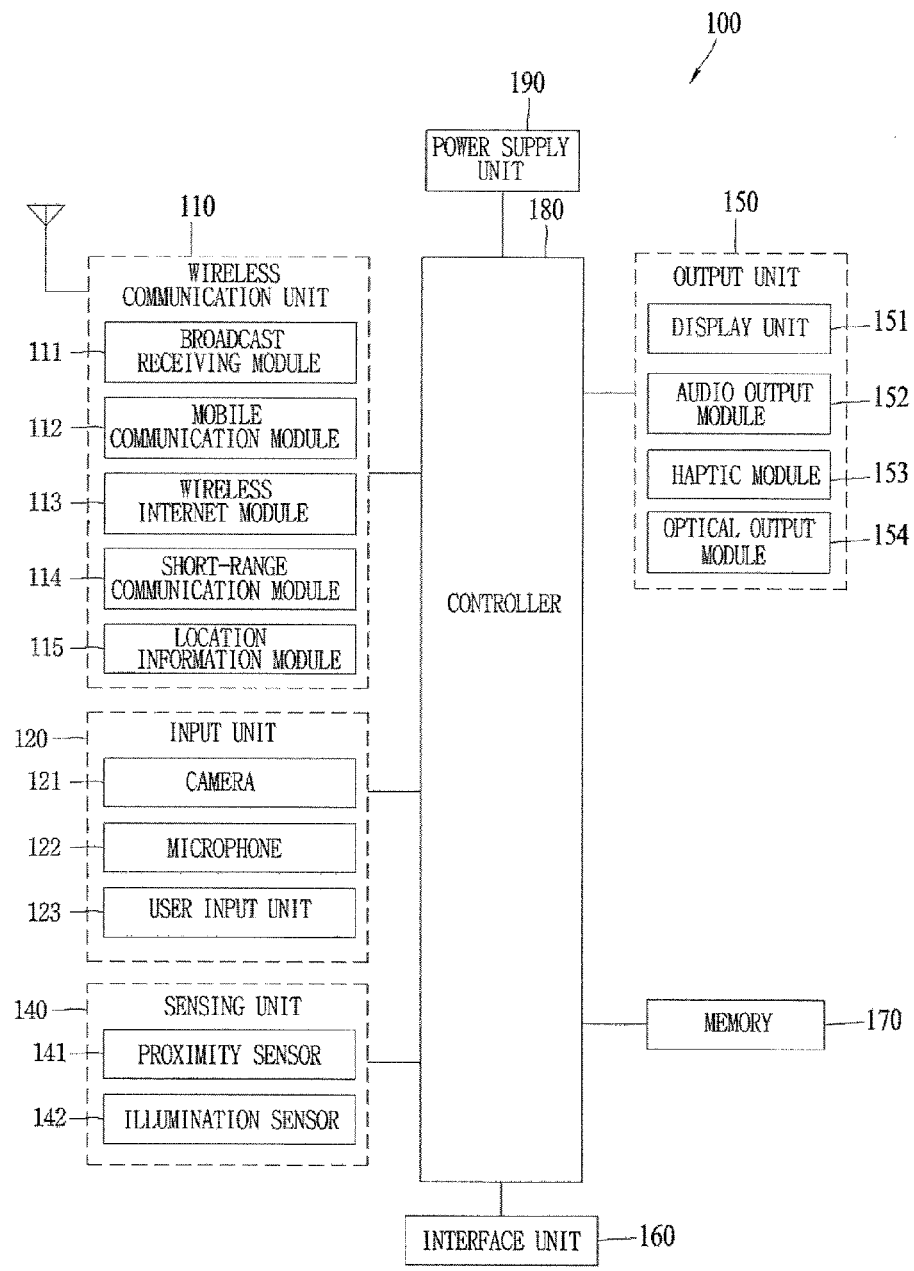
FIG. 1A is a block diagram of an example mobile terminal.
Figure 1B:
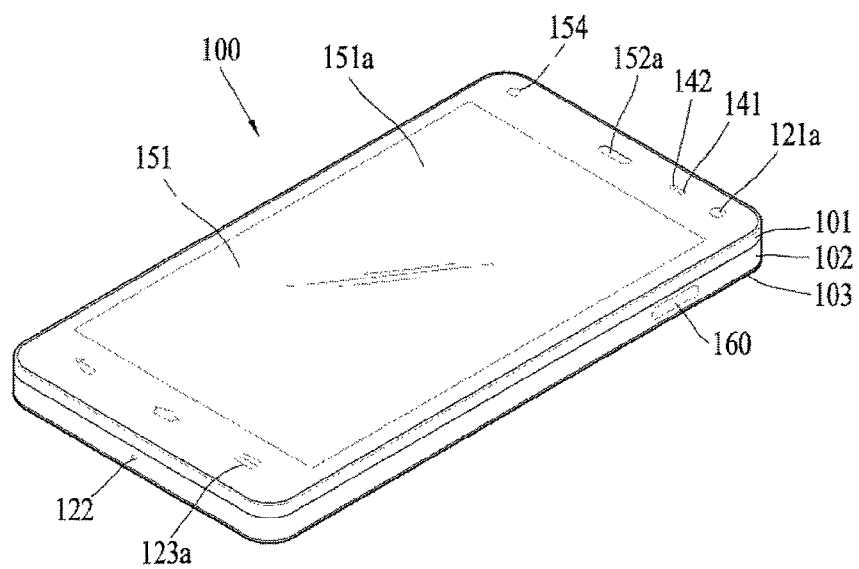
FIGS. 1B and 1C are conceptual views of example mobile terminals, viewed from different directions.
Figure 1C:
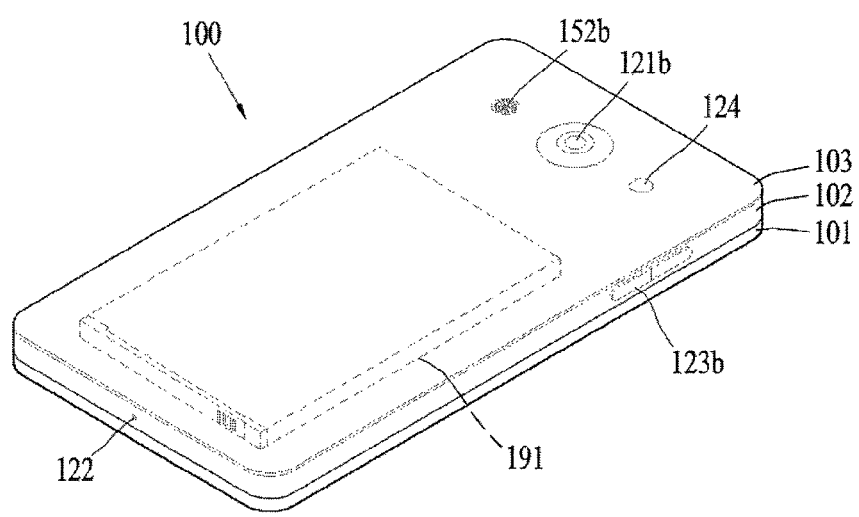

Reference is now made to FIGS. 1A-1C, where FIGS. 1A to 1C illustrate example mobile terminals.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For example, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

In some implementations, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some implementations, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some implementations, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some implementations, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some implementations, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. In some implementations, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some implementations, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. In some implementations, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In some implementations, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some implementations, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

In some implementations, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For example, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some implementations, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.).

The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various implementations disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various implementations described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In some implementations, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some implementations, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some implementations, upon the coupling, the rear case 102 may also be completely shielded by the rear cover 103. In some implementations, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

In some implementations, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For example, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a speaker to output voice audio, alarm sounds, multimedia audio reproduction, and the like.

The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In some implementations, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can manipulate it using a forefinger when the user grabs the terminal body with one hand. Alternatively, the rear input unit can be positioned at most any location of the rear side of the terminal body.

Some implementations include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. In some implementations, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. In some implementations, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

For clarity and convenience of the following description, assume that a mobile terminal includes at least one of the components shown in FIGS. 1A to 1C. For example, in some implementations, a mobile terminal can be assumed as including the wireless communication unit 110, the camera 121, the display unit 151, the memory 160 and the controller 180. In some implementations, for example, in the following description, assume that the display unit 151 is a touchscreen configured to perform an output function and an input function both.

A mobile terminal can be provided with a result of a search for an image through a communication with a server. For example, if a specific object is recognized through a preview image, the controller 180 can send an image of the recognized object or an identification information for identifying the recognized object to a server. If so, the server extracts an information on the object, which is received from the mobile terminal, from a database and is then able to provide the extracted information to the mobile terminal. Hence, the information on the specific object recognized from the preview image can be displayed through the mobile terminal.

The server can provide a search result related to an image selected as a search target through one of a deep learning algorithm, a face recognition algorithm and the like. For example, if an image of a specific person is selected as a search target, the results of the searches for an information on the corresponding person, a webpage containing the corresponding person, an image containing the corresponding person and the like can be provided to the mobile terminal.

The server may provide the mobile terminal with an information on a product contained in an image. For example, if a taken image of a specific product is selected as a search target, such information as a name of the corresponding product, a price of the corresponding product, a site address for purchasing the corresponding product and the like can be provided to the mobile terminal.

In the following description, a mobile terminal is explained in detail based on the above description.

Figure 2:
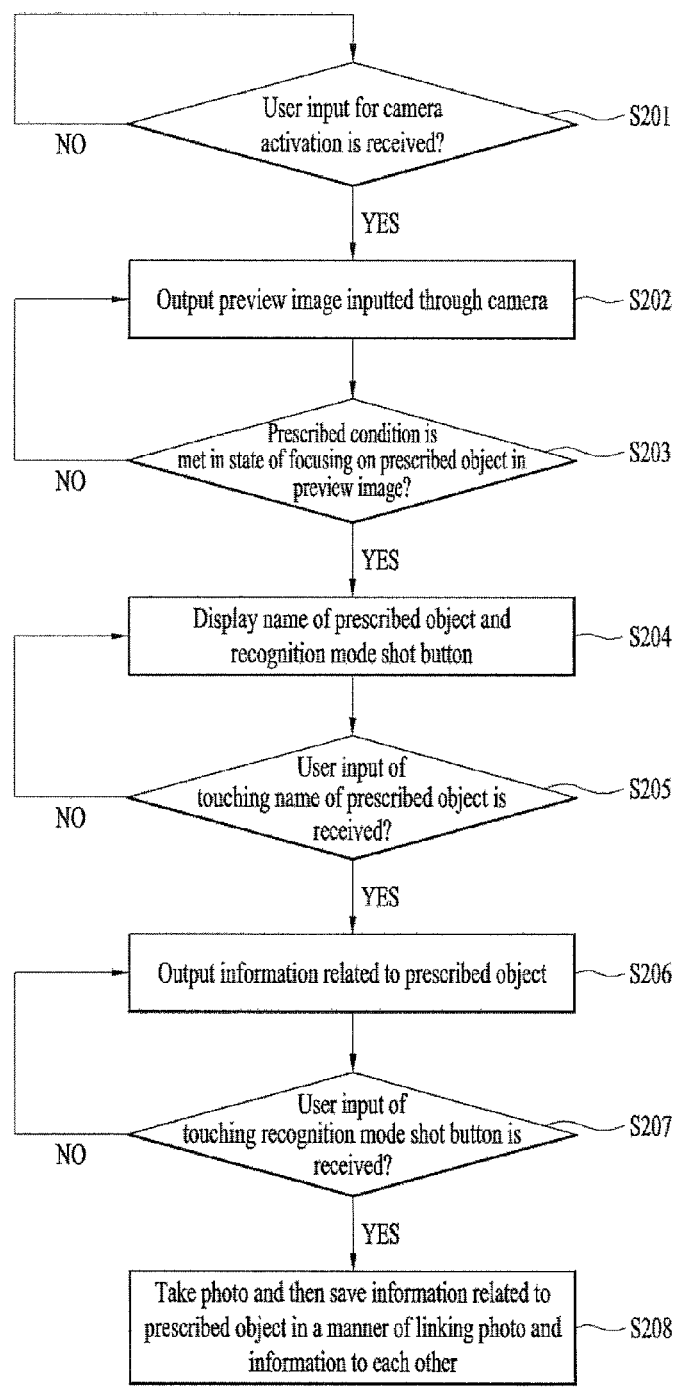
FIG. 2 is a flowchart of an example operation of a mobile terminal.

FIG. 2 illustrates an example operation of a mobile terminal.

Referring to FIG. 2, if a user input for activating the camera 121 of the mobile terminal is received [S201], the controller 180 activates the camera 121 and is then able to control a preview image, which is inputted through the camera 121, to be outputted through the display unit 151 [S202]. In doing so, the controller 180 may activate the camera 121 in response to a user input for running a camera application, a user input for selecting a photo to take through the camera 121 as an image to be attached to a message, or the like.

In some implementations, the preview image means an image inputted through the camera 121 before taking a photo. Hence, a user is able to set up a photography composition and a focus target by watching the preview image.

After focusing on a prescribed object contained in the preview image, if a preset condition is met [S203], the controller 180 can make a request for a name information of the prescribed object to a server. In particular, if the controller 180 sends image data of the prescribed object to the server, the server extracts the name information indicating the corresponding object based on the received data and is then able to provide the extracted name information to the mobile terminal.

In some implementations, the preset condition may include one of a condition that a prescribed time expires in a state of focusing on a prescribed object, a condition that a user input of touching a focused object is received, a condition that a prescribed voice command is inputted in a state of focusing on a prescribed object, a condition that a camera zooms in or out in a state of focusing on a prescribed object, and the like.

If the name information on the prescribed object is received from the server, the controller 180 can control a name of the object to be outputted [S204]. Moreover, the controller 180 triggers a photo taking and is also able to control a new shot button (hereinafter named 'recognition mode shot button'), which is provided to save a taken photo and the information on the prescribed object together in a manner that the taken photo and the corresponding information are linked to each other, to be additionally outputted, simultaneously [S204]. One example of outputting a name of an object and a recognition mode shot button is described in detail with reference to the accompanying drawing as follows.

Figure 3A:
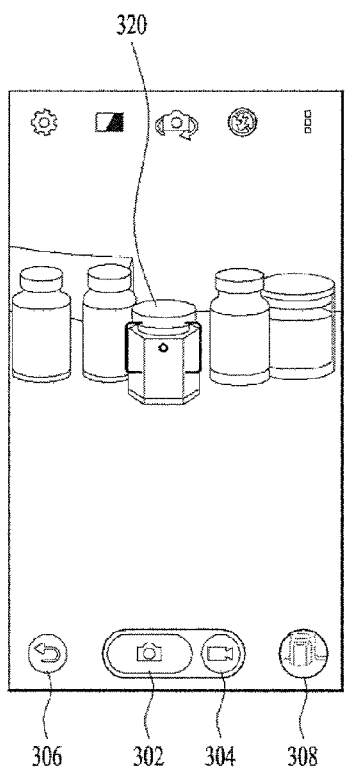
FIGS. 3A and 3B are diagrams of example mobile terminals outputting a name of an object.
Figure 5A:
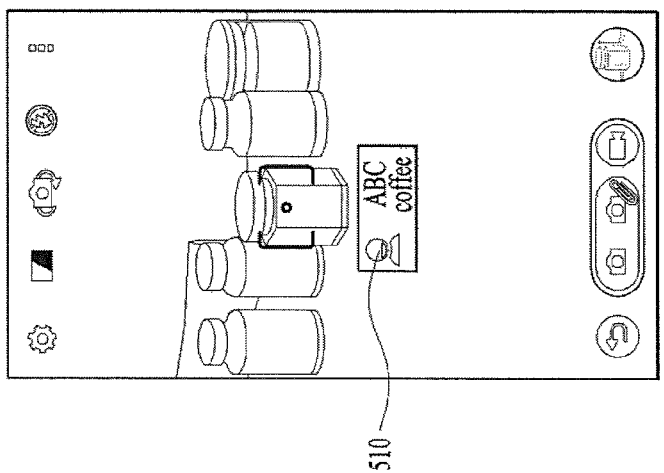
FIGS. 5A-5C are diagrams of example mobile terminals outputting an indicator.
Figure 5B:
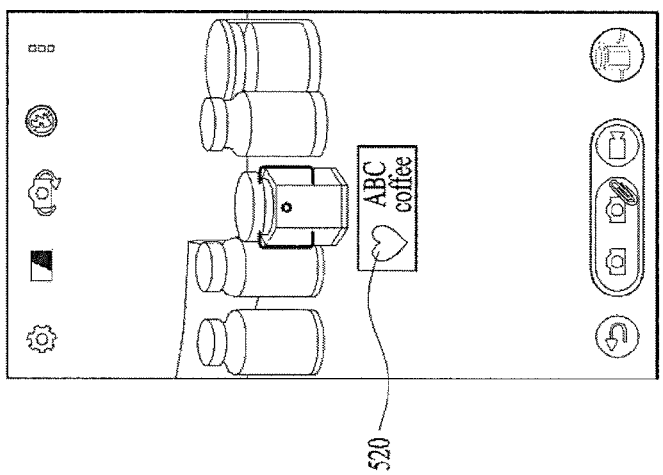

FIGS. 3A and 5B illustrate example mobile terminals outputting a name of an object.

Referring to FIG. 3A, if the camera 121 is activated, the controller 180 can control a preview image inputted through the camera 121 to be displayed. At least one or more buttons related to the settings of the camera 121 can be outputted in a manner of overlaying the preview image. For example, as shown in FIG. 3A, a shot button 302 for triggering a photo taking, a video mode button 304 for switching to a video shot mode, an end button 306 for deactivating the camera 121, a preview icon 308 for displaying a preview of an already taken photo and the like are outputted.

If a random point on the preview image is touched, the controller 180 can control the camera 121 to focus on the touched point. For example, if a touch input of touching a glass bottle 320 in the preview image shown in FIG. 3A is received, the controller 180 can control a focal distance of the camera 121 to focus on the touched glass bottle 320.

While a prescribed object included in the preview image is in focus, if a preset condition is met, the controller 180 can make a request for a name information on the focused prescribed object to a server. On the other hand, if a focus target is changed or a photography composition is changed due to a movement of the mobile terminal over a prescribed distance or a rotation of the mobile terminal over a prescribed angle, a prescribed time can be counted again from a timing point of focusing on a new object or a timing point of changing a composition.

If the prescribed time expires while the prescribed object is in focus, the controller 180 can control a feedback, which is provided to indicate that the information on the object will be outputted, to be outputted. In doing so, the output of the feedback may have one of the types such as a sound output, a vibration output, a light output and the like.

If the name information on the prescribed object is received from the server, the controller 180 can control the information on the prescribed object to be outputted in a manner of overlaying the preview image. For example, referring to FIG. 3B, a popup window 330, which indicates that the name of the focused object is 'ABC COFFEE', is outputted.

While the name of the object is outputted, the controller 180 can control the recognition mode shot button to be additionally outputted. According to the example shown in FIG. 3B, an existing shot button is divided into two equal parts including a left region and a right region. Subsequently, the left region of the button may be assigned for the existing shot button 302 (e.g., a button for simply triggering a photo taking) and the right region of the button may be assigned for a recognition mode shot button 312 (e.g., a button for commanding to save a taken photo and an information on a prescribed object together in a manner of them to each other).

Unlike the example shown in the drawing, the controller 180 may output a new recognition mode shot button over the preview image separately from the existing shot button.

Figure 3B:
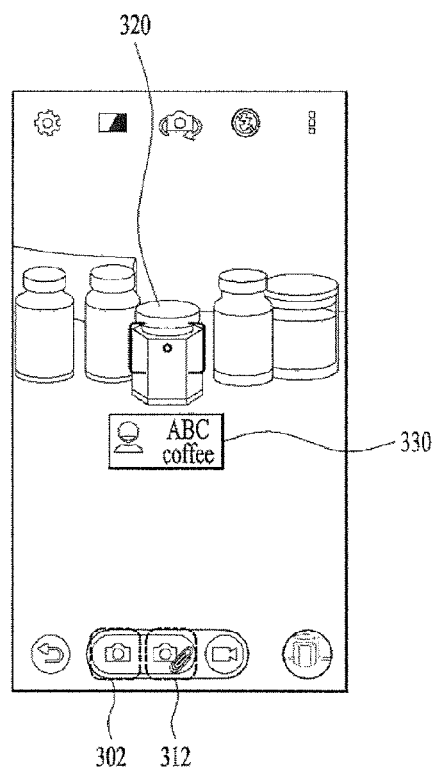

Although FIG. 3B shows that the existing shot button and the recognition mode shot button are simultaneously outputted, the controller 180 may control the recognition mode shot button to be outputted only in a manner of replacing the existing shot button.

Referring now to FIG. 2, while the name of the focused object is outputted, if a user input of touching the name information is received [S205], the controller 180 can make a request for information related to the object to the server. In response to the request, the server extracts the image data of the object or the related information matching the name of the object and is then able to provide the user with the extracted image data or the extracted information.

If the information related to the prescribed object is received from the server, the controller 180 can control the related information of the object to be outputted [S206].

The related information of the prescribed object, which is received from the server, may vary depending on a type of the prescribed object. For example, in case that the prescribed object is a product, the prescribed object related information received from the server may include a price of the product, an address to access a webpage (e.g., a webpage for displaying a search result using a product name as a keyword at a portal site, a home page of a product manufacturer, a home page of the product, etc.) for the product, a purchase information of the product, a product comment, instructions of the product, and the like.

In case that the prescribed object is a person or character, the prescribed object related information received from the server may include a profile of the person, a filmography of the person, an address to access a webpage for the person (e.g., a webpage for displaying a search result using a name of the person as a keyword at a portal site, etc.), a different photo containing the corresponding person, a purchase information of a product (e.g., VOD content, etc.) related to the corresponding person, and the like.

In case that the prescribed object is a target (e.g., a building or structure, a sculpture, etc.) for identifying a place, the prescribed object related information may include a location information on an object located place, a description of the object, an address to access a webpage for the object (e.g., a webpage for displaying a search result using a name of the building or sculpture as a keyword at a portal site, etc.), a purchase information of a product (e.g., a tour product linked to a corresponding area, etc.) related to a corresponding area, and the like.

Hereinafter, for clarity of the following description, assume that the focused object in the preview image includes a product. Hence, assume that information related to the product is outputted on the preview image. In some implementations, for example, those described below, the object is a target for identifying a person or place.

One example of outputting information related to an object is described in detail with reference to the accompanying drawing as follows.

Figure 4A:
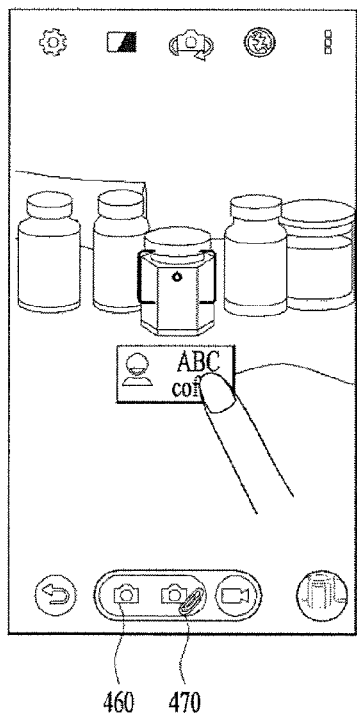
FIGS. 4A and 4B are diagrams of example mobile terminals outputting information related to an object.
Figure 4B:
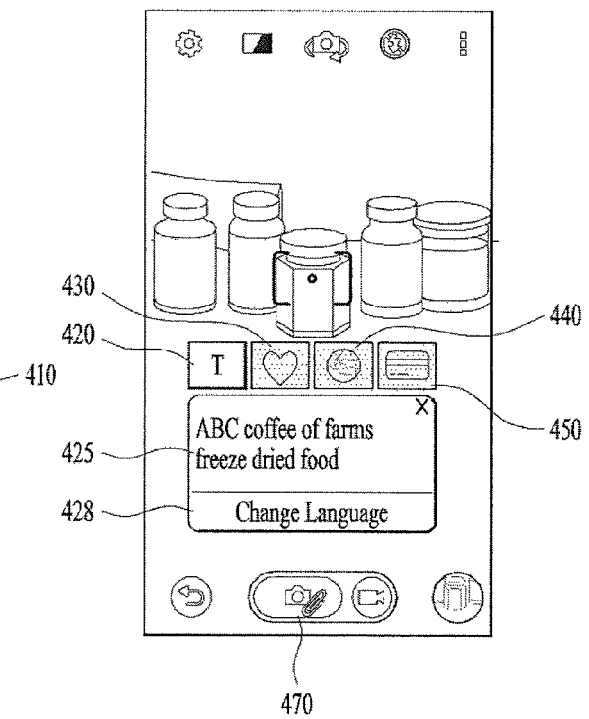

FIGS. 4A and 4B illustrate example mobile terminals outputting information related to an object.

Referring to FIGS. 4A and 4B, if an object name 410 is touched, the controller 180 can control information related to an object to be outputted. For example, if a popup window 410 indicating a name of an object is touched [e.g., FIG. 4A], the controller 180 can control a tab menu, which is provided to provide the object related information, to be outputted [e.g., FIG. 4B].

According to the example shown in FIG. 4B, 4 tabs are included in the tab menu.

The respective tabs are described as follows.

First of all, a first tab 420 is provided to display a message for describing an object. According to the example shown in FIG. 4B, as the first ab 420 is activated, a message window 425 including a message for describing the object (e.g., a message for describing a product) is outputted.

A translation button 428 for translating the description of the object may be additionally outputted to the message window 425. If the translation button 428 is touched, the controller 180 translates the description of the object into a preset language and then outputs the translated description. Alternatively, the controller 180 translates the description of the object into a language selected by a user and then outputs the translated description.

If a total quantity of the message for describing the object cannot be displayed through the message window 425, the controller 180 can control a more quantity of a message for describing the object to be outputted in response to a touch input of touching the message window 425. In doing so, the controller 180 partitions the display unit 151 into two regions, controls a preview image to be outputted to one of the two regions as it is, and also controls the message for describing the object to be outputted to the other.

Secondly, a second tab 430 is provided to add a product corresponding to an object to a wish list. If the second tab 430 is touched, the controller 180 adds the product corresponding to the object to the wish list and is also able to control a message window including a product list included in the wish list to be outputted. In some implementations, the wish list may mean a list at which products desired to be purchased by a user are registered already. Through the wish list, the user can quickly purchase a desired product in the future.

If a total quantity of the wish list cannot be displayed through the message window, the controller 180 can control a more quantity of the wish list t to be outputted in response to a touch input of touching the message window. In doing so, the controller 180 partitions the display unit 151 into two regions, controls a preview image to be outputted to one of the two regions as it is, and also controls the wish list to be outputted to the other.

Thirdly, a third tab 440 is provided to access a website related to an object. If the third tab 440 is selected, the controller 180 runs a web browser and is also able to attempt to access an address of the website related to the object. In doing so, the controller 180 partitions the display unit 151 into two regions, controls a preview image to be outputted to one of the two regions as it is, and also controls the web browser to be outputted to the other.

Finally, a fourth tab 450 is provided to purchase a product corresponding to an object. If the fourth tab 450 is selected, the controller 180 can move to a purchase page for purchasing the product corresponding to the object. And, a user is able to purchase the product corresponding to the object through the purchase page.

According to the example shown in the drawing, the information related to the object includes one of a description of the object, a wish list, a website, and a purchase. Detailed information related to the object and the number of the outputted detailed items of information are non-limited by the described example. More or less detailed items of information may be outputted or a different kind of a detailed information may be provided.

If the number of the detailed information tabs is greater than a predesignated number, the detailed information tab can be scrolled to move in response to user's touch input (e.g., an input of dragging a pointer currently touching a row in which a tab is currently displayed).

If the object related information is outputted, the controller 180 may stop outputting the existing shot button 460. Hence, like the example shown in FIG. 4B, the recognition mode shot button 470 may be displayed on the preview image only.

While the name of the object or the object related information is outputted, if a focus target in the preview image is changed or a photography composition is changed due to the movement of the mobile terminal over a prescribed distance or the rotation of the mobile terminal over a prescribed angle, the information on the object (e.g., the name of the object, the object related information) and the recognition mode shot button can stop being outputted. In particular, only if a focus on a prescribed object is being maintained, the controller 180 can control the information on the prescribed object and the recognition mode shot button to be outputted.

According to the examples shown in FIGS. 3A, 3B, 4A, and 4B, after a name of an object has been outputted, only if a touch input of touching the object name is received, information related to the object is outputted.

Unlike the examples shown in the drawings, if a condition that a focus on a prescribed object is maintained over a prescribed time is met, the controller 180 may control a name of an object and an information related to the object to be outputted simultaneously.

When a name of an object or a detailed information of the object is outputted, the controller 180 can adjust an output type of an indicator indicating a state of the object depending on whether a product corresponding to the object is already added to a wish list or whether a purchase history of a product corresponding to the object exists. An output type of an indicator is described in detail with reference to the accompanying drawing as follows.

Figure 5C:
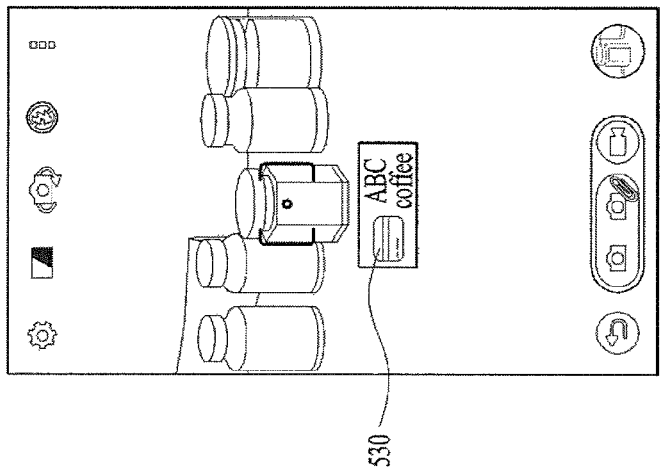

FIGS. 5A-5C illustrate example mobile terminals outputting an indicator.

Referring to FIGS. 5A-5C, when a name of an object is outputted, if a product corresponding to the object is not included in a wish list or a purchase history of a product corresponding to the object does not exist, like the example shown in FIG. 5A, the controller 180 can control the name of the object to be outputted together with a first indicator 510.

On the other hand, if a product corresponding to the object is already included in a wish list, like the example shown in FIG. 5B, the controller 180 can control the name of the object to be outputted together with a second indicator 520.

If a purchase history of a product corresponding to the object exists, like the example shown in FIG. 5C, the controller 180 can control the name of the object to be outputted together with a third indicator 530.

Through one of the above indicators, a user can recognize whether a product corresponding to the object is already added to a wish list, whether a purchase history of a product corresponding to the object exists, or the like easily and conveniently.

In case of attempting to output information related to a product included in a wish list or information related to a product having a purchase history, the controller 180 can control a message window, which is provided to query whether to purchase a product corresponding to an object, to be outputted in consideration of user's intention to purchase (or, repurchase) the corresponding product.

Figure 6C:
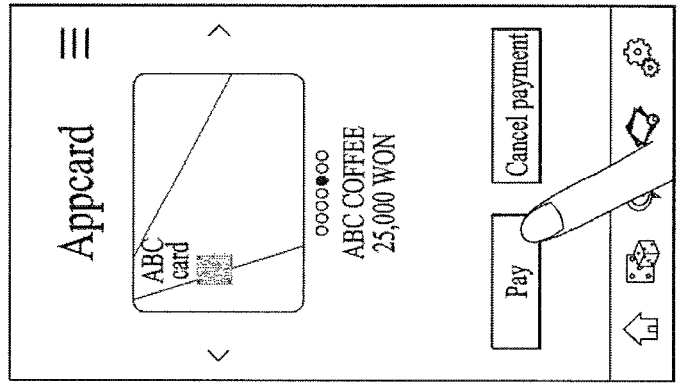
FIGS. 6A-6C are diagrams of example mobile terminals outputting a message window for querying whether to purchase a product.
Figure 6B:
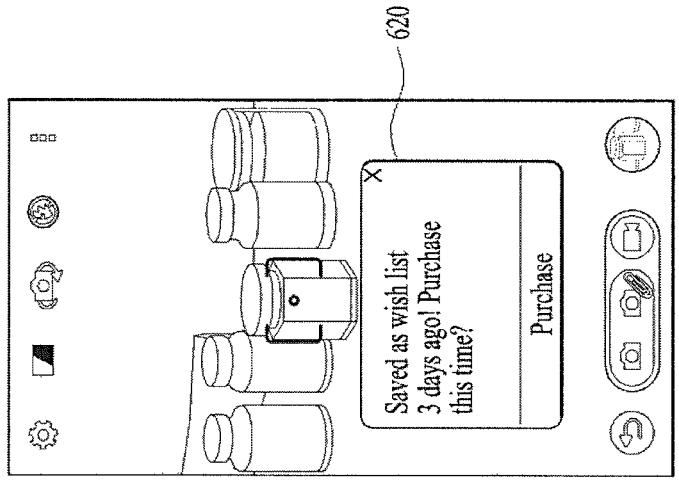
Figure 6A:
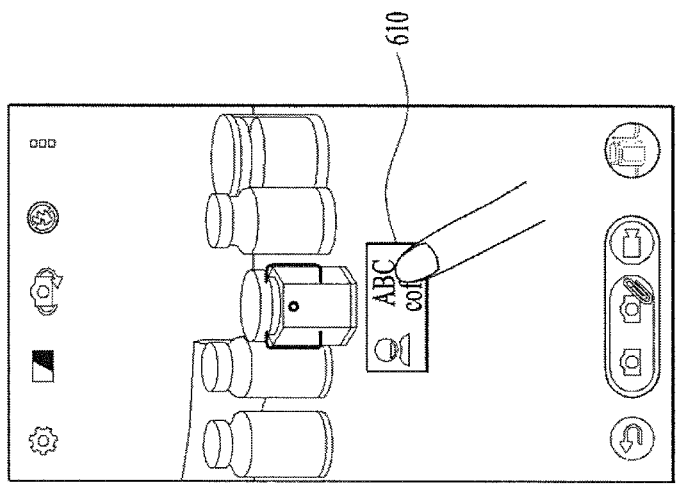

FIGS. 6A-6C illustrate example mobile terminals outputting a message window for querying whether to purchase a product.

Referring to FIGS. 6A-6C, while a name of a product included in a wish list is outputted, if a touch input of touching a product name 610 is received [e.g., FIG. 6A], the controller 180 can control a message window 620, which provides an information indicating that the corresponding product is included in the wish list and also queries whether to move to a purchase page, to be outputted [e.g., FIG. 6B].

If a user input for making a request to move to the purchase page to purchase the corresponding product is received through the message window 620, the controller 180 can enter the purchase page to purchase the corresponding product.

In some implementations, the purchase page may include one of a webpage for purchasing the corresponding product, a price comparison page for comparing prices at one or more shopping sites of selling the corresponding product, a page for making a payment of a purchase amount of the corresponding product, and the like.

Referring to FIG. 6C, a payment page for paying a purchase amount of the corresponding product is outputted.

In case that a purchase history of a product corresponding to the object exists, the controller 180 can control a message, which queries whether to purchase the corresponding product, to be outputted.

Although a product corresponding to the object is not included in the wish list or a purchase history of a product corresponding to the object does not exist, if the count of inquiries of the corresponding product is equal to or greater than a preset count, a message for querying whether to purchase the corresponding product can be outputted.

In case of attempting to output information related to a product included in a wish list or information related to a product having a purchase history, the controller 180 can output a message window querying whether to share the information of the corresponding product with a pre-registered person (or character) or a person (or character) selected by a user.

FIGS. 7A-7C illustrate example mobile terminals outputting a message window for querying whether to share a product.

Referring to FIGS. 7A-7C, while a name of a product included in a wish list is outputted, if a touch input of touching a product name 710 is received [e.g., FIG. 7A], the controller 180 can control a message window 720, which provides an information indicating that the corresponding product is included in the wish list and also queries whether to share the information of the corresponding product with another user, to be outputted [e.g., FIG. 7B].

If a user input for making a request to share the information of the corresponding product with another user is received through the message window 720, the controller 180 can control a message composing screen, which is provided to compose a message to send to another user, to be outputted [e.g., FIG. 7C]. In doing so, the information (e.g., a name of a product, a photo 750 of a product, etc.) on the corresponding product may be included in a text body 740 of the message composing screen. In particular, the photo 750 may be extracted from a preview image. And, a pre-registered person may be added as a recipient to a message recipient box 730. Alternatively, a user may manually set a recipient of the message.

In doing so, in consideration of data saved in the memory 170, the controller 180 can automatically set a substance that is to be included in a text body of the message. In particular, the controller 180 can control a text matching a context to be automatically included in the text body of the message in consideration of the message, a previously saved schedule, a call history and the like.

For example, in consideration of a substance of a most recently received message, the controller 180 may control a text, which responds to the received message, to be inserted in the text body of the message or may control a text appropriate for a schedule to be inserted in the text body of the message in consideration of a future schedule. Moreover, the controller 180 designates a most recently called person as a recipient in consideration of a call history and is also able to automatically configure a text substance, which is to be inserted in the text body of the message, in consideration of a message received from the person designated as the recipient or a schedule with the person designated as the recipient.

For example, if a birthday of a user arrives in a prescribed period from a current date, referring to FIG. 7C, the controller 180 may control a message 760, which requests to present a gift, to be inserted in a text body 740. Besides, if a birthday of a person designated as a recipient arrives in a prescribed period from a current date, the controller 180 may control a message, which indicates that the corresponding product will be provided as a gift, to be inserted in a text body 740.

In case that a purchase history of a product corresponding to the object exists, the controller 180 can control a message, which queries whether to share the corresponding product with another user, to be outputted.

Although a product corresponding to the object is not included in the wish list or a purchase history of a product corresponding to the object does not exist, if the count of inquiries of the corresponding product is equal to or greater than a preset count, a message for querying whether to share the corresponding product can be outputted.

In some implementations, as information related to a product corresponding to an object, a description of the product, an address to access a website related to the product, a purchase page for purchasing the product and the like are included. Moreover, as mentioned in the foregoing description, the information on the product related to the object can further include a product comment, instructions of the product, and the like. In consideration of a location of the mobile terminal, the controller 180 can determine which one of the items of information related to the product corresponding to the object will be preferentially outputted.

Figure 8A:
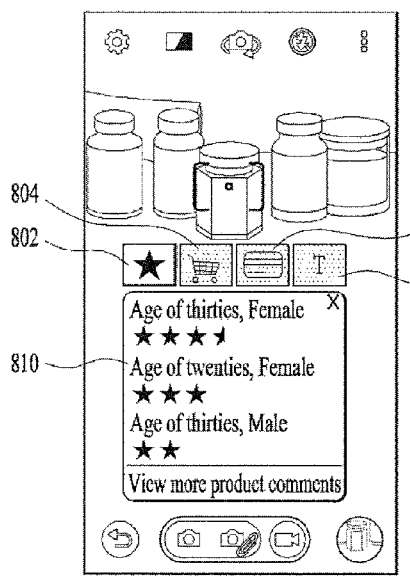
FIGS. 8A and 8B are diagrams of example mobile terminals adjusting an output sequence of information related to a product in accordance with a location of a mobile terminal.
Figure 8B:
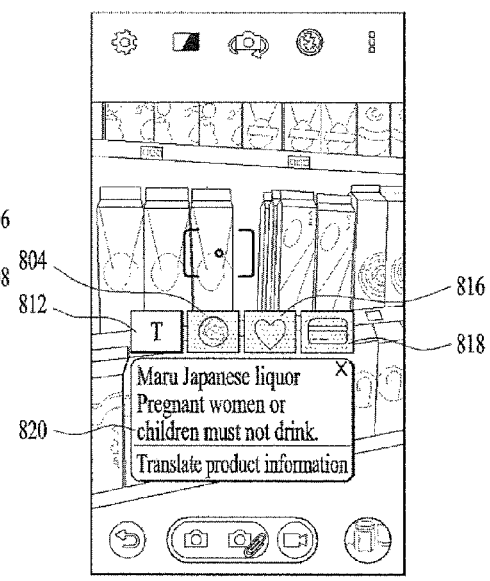

FIGS. 8A and 8B illustrate example mobile terminals adjusting an output sequence of information related to a product in accordance with a location of a mobile terminal.

Referring to FIG. 8A, when the mobile terminal is located in a domestic mart, if an object indicates a product displayed in the mart, the controller 180 can output a tab menu configured in order of a product comment 802 of the product corresponding to the object, a shopping basket loading 804, a payment 806, a product information 808, and the like. According to the example shown in FIG. 8A, as a tab indicating the product comment in the tab menu is activated, a message window 810 including the product comment is outputted.

On the other hand, referring to FIG. 8B, when the mobile terminal is located in a foreign country, if an object indicates a product displayed in the mart, the controller 180 can output a tab menu configured in order of a translation page 812 of translating a name and description of the product corresponding to the object, an address 814 to access a website related to the product, a wish list 816, a payment 816, and the like. According to the example shown in FIG. 8B, as a tab indicating the product information in the tab menu is activated, a message window 820 including the product information is outputted.

Like the example shown in the drawing, if the mobile terminal is located in a domestic area, the controller 180 can preferentially output a product comment. If the mobile terminal is located in a foreign country, the controller 180 can preferentially output a translation page of a product description. In particular, the controller 180 can adjust information, which is to be preferentially outputted, among the items of information related to a product in accordance with a location of the mobile terminal.

For example, while a user is travelling overseas, if a prescribed object is recognized through the mobile terminal, it is highly probable that a product corresponding to the recognized object may be an unaccustomed product to the user. Hence, if the user is abroad, describing what is the product corresponding to the recognized object may be the most useful information for the user.

On the contrary, if a user is in a domestic area, it is highly probable that a product corresponding to the recognized object may be a product the user hesitates to purchase. Hence, if the user is in the domestic area, offering other consumers' various evaluations on the product corresponding to the recognized object may be the most useful information for the user.

Thus, as the sequence in outputting the items of information related to a product is adjusted in accordance with a situation of the mobile terminal, it is advantageous in that information estimated as most useful for a user can be preferentially provided in accordance with the situation.

When items of information related to a product are outputted, the mobile terminal may determine which one of the items of information related to the product will be preferentially outputted through detection of language displayed on the product. For example, if a language written on a product is Korean, like the example shown in FIG. 8A, the controller 180 can control a product comment of a product corresponding to a recognized object to be preferentially outputted.

In some implementations, if a language written on a product is a foreign language, like the example shown in FIG. 8B, the controller 180 can control a product information of a product corresponding to a recognized object to be preferentially outputted.

In some implementations, information of describing a product is provided in user's mother language. For example, if a user is a Korean, the description of a product corresponding to a recognized object may be preferably outputted in Korean.

To this end, if a product description received from a server is written based on a second language, the controller 180 can automatically output the received product description in a manner of translating the received product description into a first language. For example, if a product description received from a server is written in English, the controller 180 can automatically output the received product description in a manner of translating the received product description into Korean.

In some implementations, the controller 180 outputs the received product description as it is and is also able to control the currently outputted product description to be outputted in a manner of being translated into another language in response to a user input.

FIGS. 9A-9C illustrate example mobile terminals outputting a translated product description.

Referring to FIG. 9A, the controller 180 can output a product description received from a server. In doing so, a translation button 915 for translating a description of a product can be included in a message window 910 containing the product description. If the translation button 915 is touched, referring to FIG. 9B, the controller 180 can control a translation text, which is created from translating the product description into a preset language, to be outputted through the message window 910.

If a prescribed user input is applied to the translation button 915, the controller 180 can control a setting screen, which is provided to set a translation language, to be outputted. For example, if a long touch input of touching the translation button over a prescribed time is received, referring to FIG. 9C, the controller 180 can control a setting screen, which is provided to set a translation language, to be outputted.

According to the example shown in FIG. 9C, a pre-translation product description 930, a translation language setting button 920 for setting a translation language, and a translated product description 940 translated into the set translation language are included in the setting screen. Hence, a user is able to set a translation language through the button 920 for setting the translation language.

Referring now to FIG. 2, if a user input of touching the recognition mode shot button is received [S207], the controller 180 can take a photo through the camera 121 [S208]. Moreover, the controller 180 can control the description of the focused object to be saved in a manner of being linked to the taken photo [S208].

In displaying a taken photo list, the controller 180 can control a photo taken through the recognition mode shot button to be displayed in a manner of being identifiable from a photo taken through a normal shot button.

Figure 10:
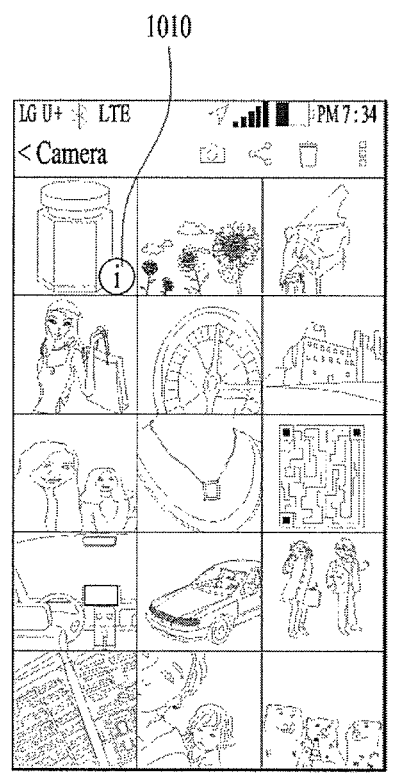
FIG. 10 is a diagram of an example mobile terminal displaying a photo taken through a recognition mode shot button identifiably from a photo taken through a normal shot button.

FIG. 10 illustrates an example mobile terminal example of displaying a photo taken through a recognition mode shot button identifiably from a photo taken through a normal shot button.

Referring to FIG. 10, the controller 180 can control an indicator 1010, which indicates that a photo is taken through a recognition mode shot button, to be outputted over the photo taken through the recognition mode shot button in a photo shot list. Depending on a presence or non-presence of the indicator 1010, a user may recognize whether the corresponding photo is taken through the recognition mode shot button or the normal shot button.

According to the example shown in FIG. 10, an indicator is used as a visual element for identifying a photo taken through a normal shot button and a photo taken through a recognition mode shot button from each other. For example, a photo taken through a normal shot button and a photo taken through a recognition mode shot button may be displayed in a manner of being identifiable from each other based on at least one of an outline of a photo, a display of a text over a photo, a size of a photo in a list, and the like.

In some implementations, the controller 180 can save a photo taken through a normal shot button and a photo taken through a recognition mode shot button to separate folders, respectively. In particular, a photo taken through a normal shot button may be saved to a first folder in a gallery, while a photo taken through a recognition mode shot button may be saved to a second folder in the gallery.

In case of inquiring a photo taken through a recognition mode shot button, the controller 180 displays the taken photo and is also able to control information on an object (e.g., a focused object at the time of photographing) contained in the photo to be outputted.

Figure 11A:
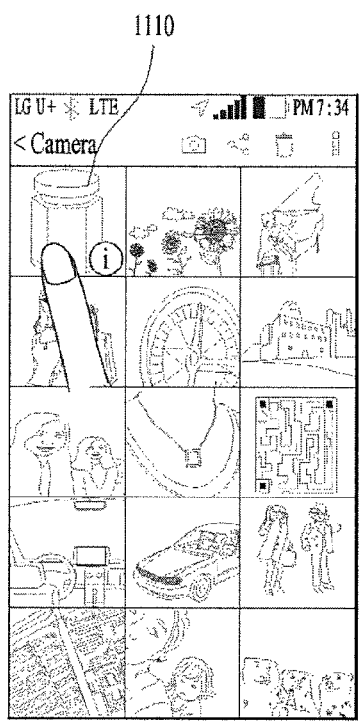
FIGS. 11A and 11B are diagrams of example mobile terminals outputting a photo taken through a recognition mode shot button.
Figure 11B:
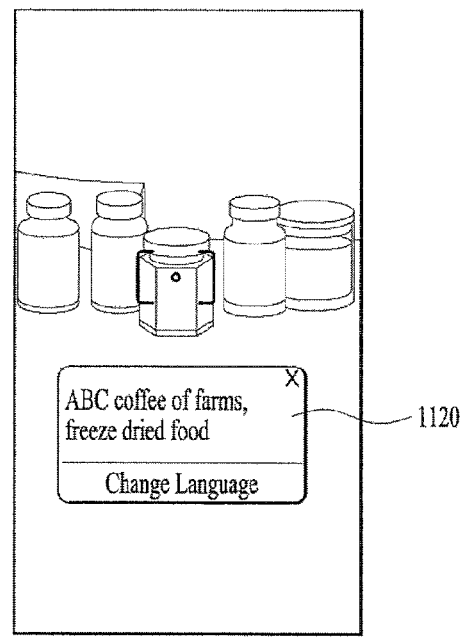

FIGS. 11A and 11B illustrate example mobile terminals outputting a photo taken through a recognition mode shot button.

Referring to FIG. 11A, if a user input of selecting a photo item 110 of a photo taken through a recognition mode shot button from a photo list shown in FIG. 11A is received, the controller 180 can output the selected photo through the display unit 151. In doing so, referring to FIG. 11B, the controller 180 can control an information 1120 (e.g., information on a focused object at the time of photographing) on an object linked to the selected photo to be outputted in a manner of overlaying the corresponding photo. According to the example shown in FIG. 11B, a message window 1120 containing a description of the object on the photo is outputted.

Like the example shown in the drawing, when the controller 180 outputs a photo taken through a recognition mode shot button, the controller 180 can control information related to an object contained in the corresponding photo to be outputted together. Through this, a user can read and view the information of the object contained in the photo easily and conveniently.

According to the examples shown in FIGS. 11A and 11B, as a user input for selecting a photo taken through a recognition mode shot button is received, the photo and the information on an object linked to the photo are simultaneously outputted. For another example, after a photo has been outputted in the first place, if a user input of touching an object in the photo (or a user input of touching a random point on the photo) is received, the controller 180 can control information on the object to be outputted.

In some implementations, when an information on a prescribed object is displayed, a recognition mode shot button is additionally outputted. Moreover, if the recognition mode shot button is touched, a photo is taken and an information on the object is also saved in a manner of being linked to the taken photo.

On the other hand, based on a type of a user input to a normal shot button, the controller 180 takes a photo and may be then able to determine whether to save information on an object in a manner of linking the information to the taken photo.

For example, if a first touch input is applied to a shot button, the controller 180 takes a photo but may not save information on an object in a manner of linking the information to the taken photo. In some implementations, if a second touch input is applied to a shot button the controller 180 taken a photo and is also able to save information on an object in a manner of linking the information to the taken photo.

Thus, based on a touch input to a shot button, the controller 180 can determine whether to save information on an object in a manner of linking the information to a taken photo. In doing so, the first touch input and the second touch input can be distinguished from each other by at least one of a shot button touched duration, a shot button touch count, the number of pointers touching a shot button, and the like.

The subject matter described above can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

Accordingly, implementations of the subject matter described in this application provide various effects and/or features.

First of all, the subject matter described in this application can enhance user's convenience.

In particular, the subject matter described in this application provides a mobile terminal and controlling method thereof, whereby information on an object included in a preview image of a camera can be outputted.

Moreover, the subject matter described in this application provides a mobile terminal and controlling method thereof, whereby a taken photo and an information on an object can be saved in a manner of being linked to each other.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

What is claimed is:

1. A mobile terminal comprising:
a display unit;
a camera that is configured to capture images; and
a controller that is configured to:
    access a preview image that is captured by the camera and that includes an object;
    determine, based on the preview image, whether the camera is focused on the object and a prescribed condition of the object is satisfied, the prescribed condition comprising at least one of a prescribed time expiring while focusing on the object or receiving a user input of touching the focused object;
    reset a timing of the prescribed time based on detecting that the mobile terminal has moved a prescribed distance and based on the prescribed time having not expired since the camera focused on the object; and
    output, based on a determination that the camera is focused on the object and the prescribed condition of the object is satisfied, information associated with the object by overlaying the information associated with the object on the preview image.

2. The mobile terminal of claim 1, wherein:
the preview image includes a first shot button that is configured to trigger taking an image with the camera, and
the controller is configured to output a second shot button to the preview image.

3. The mobile terminal of claim 2, wherein the controller is configured to take an image through the camera and save the taken image in association with the information based on receiving a touch input of the second shot button.

4. The mobile terminal of claim 3, wherein the controller is configured to display the image and overlay the information on the taken image based on receiving a user input for inquiring about the image taken through the second shot button.

5. The mobile terminal of claim 2, wherein the controller is configured to take an image through the camera and prevent saving of the information in association with the taken image based on receiving a touch input of the first shot button.

6. The mobile terminal of claim 2, wherein the controller is configured to output an image list and display, in the image list and in a distinguishable manner, a first image taken through the first shot button and a second image taken through the second shot button.

7. The mobile terminal of claim 1, wherein the controller is configured to indicate that the information will be outputted by outputting feedback based on the prescribed condition expiring while focusing on the object.

8. The mobile terminal of claim 7, wherein the feedback includes at least one of sound, vibration, or light.

9. The mobile terminal of claim 1, wherein the controller is configured to stop outputting the information based on the camera no longer being focused on the object.

10. The mobile terminal of claim 1, wherein the information comprises at least one of a name of the object, a description of the object, an address to access a website related to the object, purchasing information for the object, a wish list of a user, or purchasing information for a product associated with the object.

11. A mobile terminal comprising:
a display unit;
a camera that is configured to capture images; and
a controller that is configured to:
access a preview image that is captured by the camera and that includes an object;
determine, based on the preview image, whether the camera is focused on the object and a prescribed condition of the object is satisfied;
output, based on a determination that the camera is focused on the object and the prescribed condition of the object is satisfied, information associated with the object by overlaying the information associated with the object on the preview image;
output first subordinate information in the information based on a date associated with the information not being within a prescribed period; and
output second subordinate information in the information based on a date associated with the information being within the prescribed period.

12. A mobile terminal comprising:
a display unit;
a camera that is configured to capture images; and
a controller that is configured to:
access a preview image that is captured by the camera and that includes an object;
determine, based on the preview image, whether the camera is focused on the object and a prescribed condition of the object is satisfied;
output, based on a determination that the camera is focused on the object and the prescribed condition of the object is satisfied, information associated with the object by overlaying the information associated with the object on the preview image; and
output, after expiration of a prescribed period, a message composition screen that is configured to share the object with another terminal based on a date associated with the information being within the prescribed period.

13. The mobile terminal of claim 12, wherein the controller is configured to add a taken image of the object to a text body in the message composition screen.

14. A method of controlling a mobile terminal, comprising:
outputting a preview image that is captured through a camera;
focusing on an object that is included in the preview image;
determining that a prescribed condition of the object is satisfied, the prescribed condition comprising at least one of a prescribed time expiring while focusing on the object or receiving a user input of touching the focused object;
resetting a timing of the prescribed time based on detecting that the mobile terminal has moved a prescribed distance and based on the prescribed time having not expired since the camera focused on the object; and
based on the camera being focused on the object and the prescribed condition being satisfied, displaying information associated with the object by overlaying the information associated with the object on the preview image.

15. The method of claim 14, comprising:
displaying, in the preview image, a first shot button that is configured to trigger taking an image with the camera; and
displaying, in the preview image, a second shot button.

16. The method of claim 14, comprising:
indicating that the information will be outputted by outputting feedback based on the prescribed condition expiring while focusing on the object.

17. The method of claim 14, wherein the prescribed condition comprises at least one of a prescribed time expiring while focusing on the object or receiving a user input of touching the focused object.

18. The method of claim 14, comprising:
stopping to output the information based on the camera no longer being focused on the object.

* * * * *